United States Patent

Olschewski et al.

[11] 3,951,473
[45] Apr. 20, 1976

[54] BALL BEARING FOR LONGITUDINAL MOVEMENTS

[75] Inventors: Armin Olschewski, Schweinfurt; Erich Burkl, Stammheim; Lothar Walter, Schweinfurt; Manfred Brandenstein, Aschfeld, all of Germany

[73] Assignee: SKF Industrial Trading and Development Company, B.V., Jutphaas, Netherlands

[22] Filed: May 20, 1975

[21] Appl. No.: 579,264

[30] Foreign Application Priority Data
June 1, 1974 Germany............................ 7419065

[52] U.S. Cl............................................. 308/6 C
[51] Int. Cl.² ....................................... F16C 29/06
[58] Field of Search............. 308/6 R, 6 C, 201, 217

[56] References Cited
UNITED STATES PATENTS
3,844,629 10/1974 Haines ............................... 308/6 C
3,891,284 6/1975 Ernst et al........................... 308/6 C FOREIGN PATENTS OR APPLICATIONS
1,575,608 1/1970 Germany............................ 308/6 C Primary Examiner—M. H. Wood, Jr.
Assistant Examiner—Gene A. Church
Attorney, Agent, or Firm—Daniel M. Rosen

[57] ABSTRACT

A linear ball bearing with a sleeve housing having radially-extending apertures and adjacent thereto axial load-bearing tracks, and in each aperture a removable insert which includes therein a return groove for non-load-bearing balls, said tracks and grooves forming continuous rows of balls.

18 Claims, 9 Drawing Figures

BALL BEARING FOR LONGITUDINAL MOVEMENTS

BACKGROUND OF THE INVENTION

The present invention relates to a ball bearing for longitudinal movements, i.e., linear bearings which have circumferentially distributed inherently closed rows of balls and a sleeve provided with a radial opening for each closed row of balls.

There is known in the art a ball bearing for longitudinal movements, which has a sleeve made of elastic plastic, in which there are snap-fastened in the area of the load-bearing balls of each enclosed row of balls angularly movable steel traveller plates inside radial apertures of the sleeve. This known ball bearing is attended by the drawback that the track of the steel traveller plates, on account of their angular mobility in longitudinal direction, continuously changes its position as a function of the bearing load and speed, so that the extremities of said track are not aligned with the extremities of the respective non-angularly movable deflection track of the sleeve. As a result, the balls abut shock-like at the transition point between the track and the deflector track at the edges of said tracks, being exposed there to a damaging wear as a result of the contacting. A similar drawback is inherent in the axial mobility of the steel traveller plates that are mounted into the sleeve with little axial play; as a result of said axial play, there is caused in the ball bearing, gaps or cleavages between the axial track of the load-bearing balls and the deflection track, which impair the rolling and moving of the balls. Moreover, during manufacture it is necessary to maintain close tolerances with regard to the individual steel traveller plates of a given bearing in view of the fact that said traveller plates may have only very small deviations in their wall thicknesses. As a result, manufacturing of the bearing is rendered more difficult and expensive.

It is the object of the invention to create a linear ball bearing for longitudinal movements, which obviates these drawbacks.

SUMMARY OF THE INVENTION

In accordance with the invention, there are insert elements inserted into the apertures of the sleeve distributed over the circumference and separated by axially oriented lands, which carry the return grooves for the non-load bearing balls of each enclosed row of balls.

According to one embodiment of the invention, there have been machined into the land, the axial track of the load-bearing balls as well as the pertinent return tracks of an enclosed row of balls. The pertinent axial return groove of the non-load bearing balls is provided for in the inserted element. An annular ball retainer, made for instance of plastic, which provides lateral guidance for the load-bearing balls, is inserted into the borehole of the sleeve. Said ball retainer is provided with radial recesses distributed over its circumference, which are engaged by the inserted element by means of a projection or the like, thereby maintaining the ball retainer stationary against twisting within the annular body.

In the case of another embodiment of the invention, there exists in the land, only the axial track of the load-bearing balls of a closed row of balls, whereas, in the inserted element, there have been machined both the axial return groove of the non-load bearing balls as well as the two deflector tracks of said closed row of balls. The load-bearing balls of two adjoining lands are guided laterally by the front areas of the interpolated element. This arrangement advantageously obviates the incorporation of a special ball retainer into the sleeve, which results in simple and efficient manufacture of the ball bearing.

Also in accordance with this invention, the sleeve of the ball bearing can be alternately axially slotted in the area of its radial apertures on one face, and then on the other face. By this one may obtain the advantage of a high elastic yieldability of the sleeve along its two faces, resulting in substantial elastic adjustability of the sleeve over the circumference.

At the extremities of the bearing there can be inserted per se, known gaskets into the borehole of the sleeve, which protect the interior of the bearing against the entrance of damaging dust or soil particles.

One advantage obtainable by the invention is that the axial track of the load-bearing balls with its deflector track, and the axial return track of the non-loading bearing balls are aligned in the case of each enclosed row of balls, in view of the fact that the land and the pertinent incorporated element constitute one unit that is angularly movable at the circumference of the bearing within the elasticity limits of the sleeve. This angular mobility exists above all else if, in accordance with another characteristic of the invention, the lands of the sleeve are designed to be spherical in axial direction at their outer shell surface, thereby permitting an angular adjustment of the various lands with their pertinent elements as a function of the load.

The inserted elements are preferably made of elastic plastic filled with a solid lubricant, e.g., molybdenum disulfide and/or graphite, so that the ball bearing in accordance with this invention is provided with emergency running properties.

The design and mode of operation of the ball bearing in accordance with the invention are explained below with reference to the drawings of two preferred embodiments.

DETAILED DESCRIPTION OF THE PREFERRED EMBODIMENTS

Figure 1:
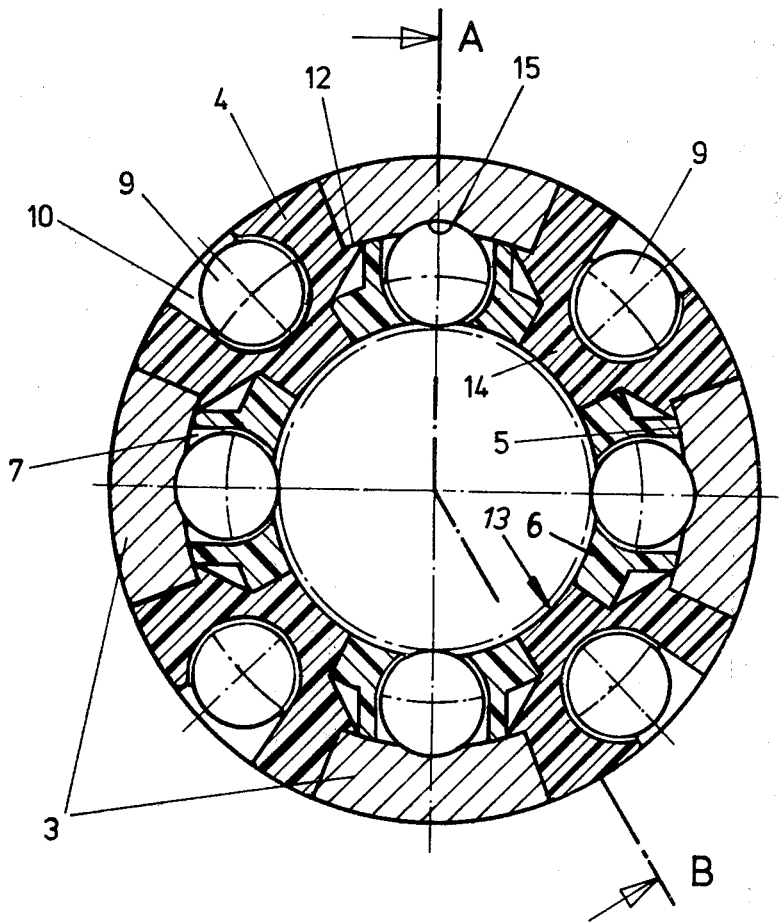
FIG. 1 is a cross-sectional view of a ball bearing in accordance with the invention.
Figure 2:
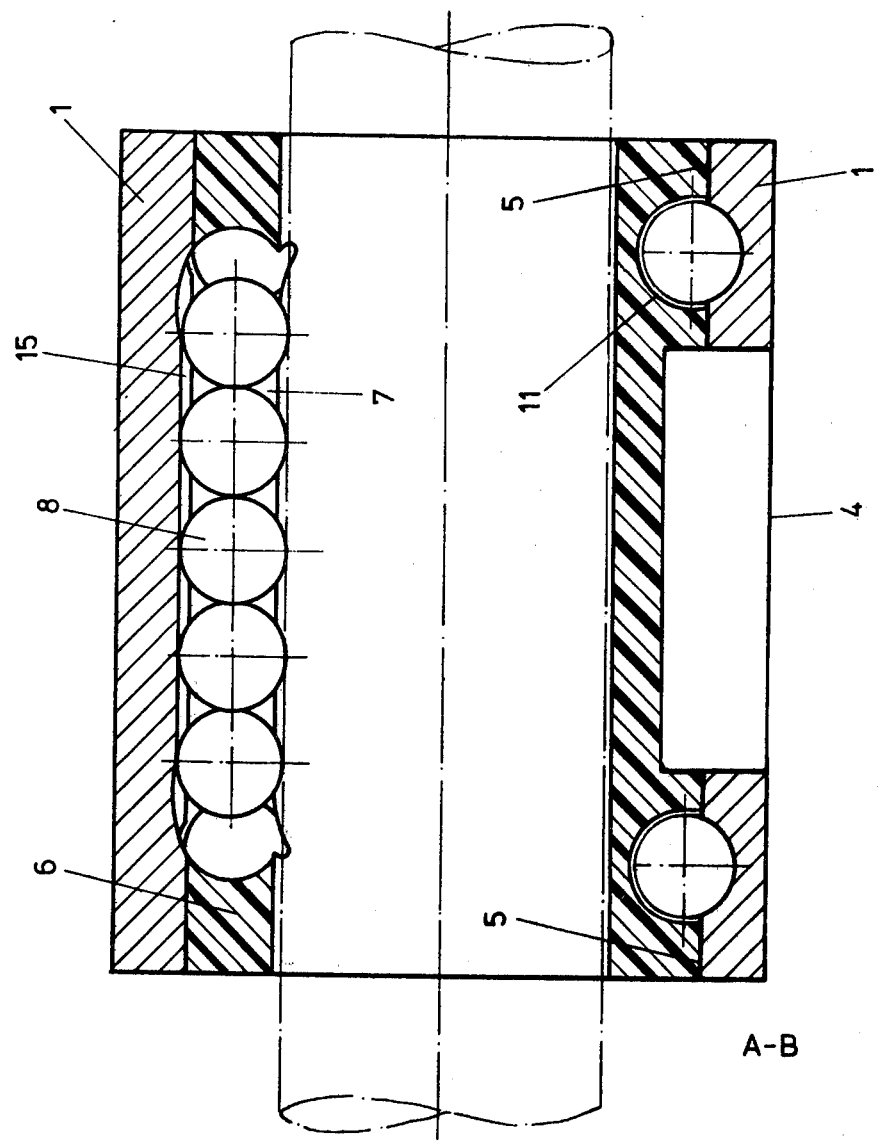
FIG. 2 is a longitudinal sectional view taken along line A–B through the ball bearing illustrated in FIG. 1.
Figure 3:
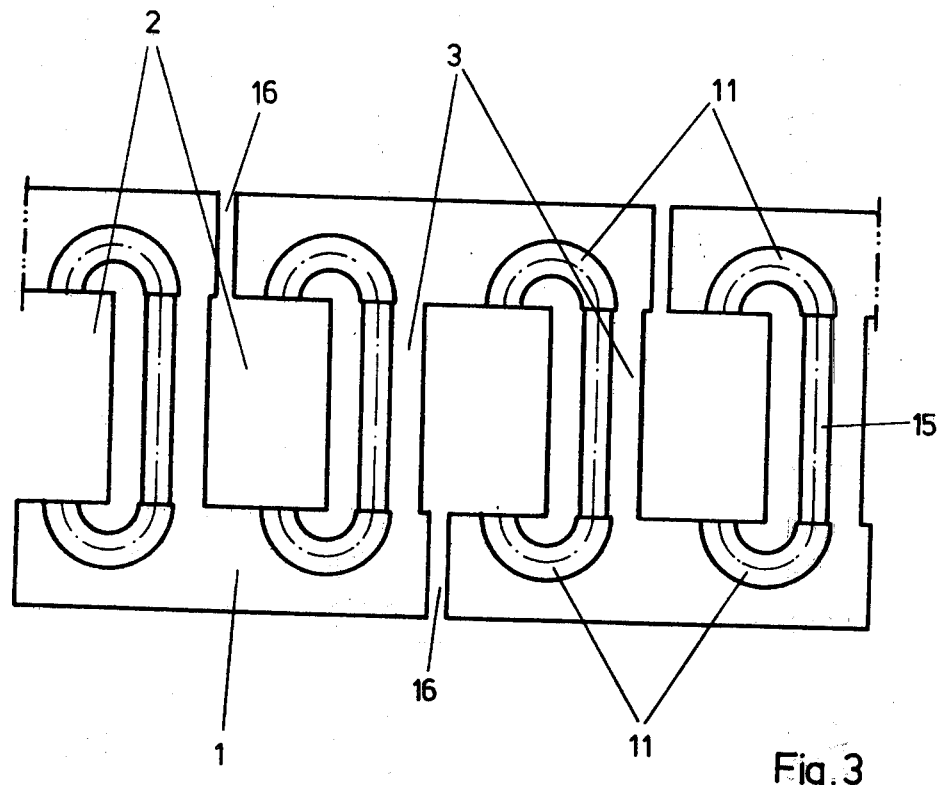
FIG. 3 is a partial plan view of the rolled-out sleeve of the ball bearing illustrated in FIG. 1.
Figure 4:
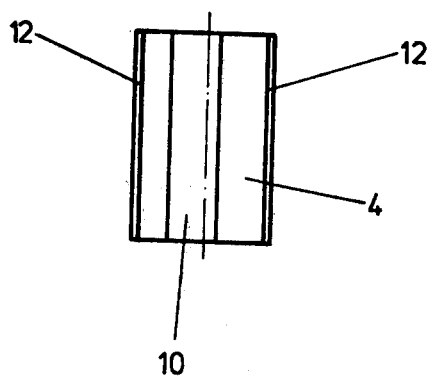
FIG. 4 is a plan view of an element of the ball bearing illustrated in FIG. 1.

In the FIGS. 1, 2, 3 and 4, there is illustrated a design of the ball bearing in accordance with the invention, with four enclosed rows of balls along its circumference. The bearing consists of a sleeve 1 made of steel and having four circumferentially distributed radial apertures 2 between the lands 3, four plastic elastic elements 4 that are radially snapped into the apertures 2, a ball retainer 6, laterally inserted into the borehole 5 of the sleeve 1 and having four axially oriented guide grooves 7, load-bearing balls 8 running in the guide grooves 7 and non-load-bearing balls 9 accommodated and running in the axially oriented return groove 10 in the elements 4. In this arrangement, a deflector track 11 is machined at either extremity of the track of one land 3, which brings about the connection between the load-bearing balls 8 of the guide groove 7 and the non-load-bearing balls 9 in the axially oriented return groove 10 of each closed row of balls.

Upon assembly of the ball bearing of this design, one initially inserts the ball retainer 6 laterally into the borehole 5 of the sleeve 1, causing the guide grooves 7 of the ball retainer 6 to become situated beneath the lands 3 of the sleeve 1. Then, the elements 4 made of elastic plastic material are snapped into the radial apertures 2 of the sleeve 1, causing the laterally projecting fastening lugs 12 of each element 4 to become hooked in the borehole 5 of the sleeve 1 and the accommodation by the recesses 13 of the ball retainer 6 of a radially inwardly oriented projection 14 of the pertinent element 4. As a result of said projection 14, the ball retainer 6 is prevented from twisting while being maintained inside the borehole 5 of the sleeve 1. Finally, the balls are introduced and snap-mounted from the outside into each element 4 made of elastic plastic material, so that each closed row of balls is completed with balls in its guide groove 7, in its two deflector tracks 11, and in its return groove 10. In the area of the lands, there is preferably machined an axially oriented track groove 15 in the borehole 5 of the sleeve, so that, as a result of the close fit between load-bearing balls 8 and the track groove 15, there is brought about a high load-bearing capacity of the bearing. To impart to the sleeve 1 a maximum possible elasticity, which is advantageous for the adjustability of the angle of the ball bearing in the case of minor sloped positions of the bearing elements, said sleeve 1 is provided in the area of the apertures 2 with an axial slot 16 alternately on one face and then on the other.

Figure 5:
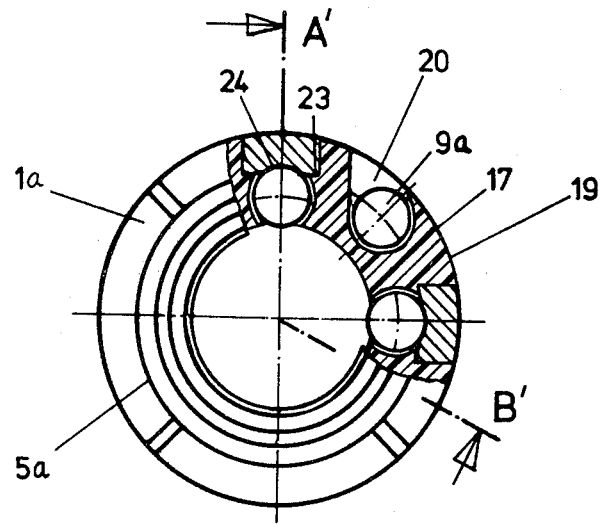
FIG. 5 is an end elevation view, partially in section of another embodiment of the ball bearing in accordance with the invention.
Figure 6:
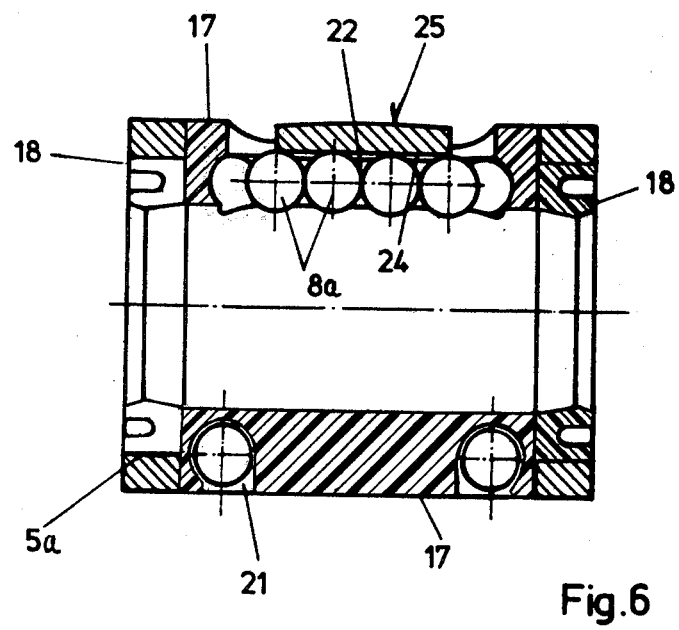
FIG. 6 is a longitudinal sectional view taken along line A'–B' of the ball bearing illustrated in FIG. 5.
Figure 7:
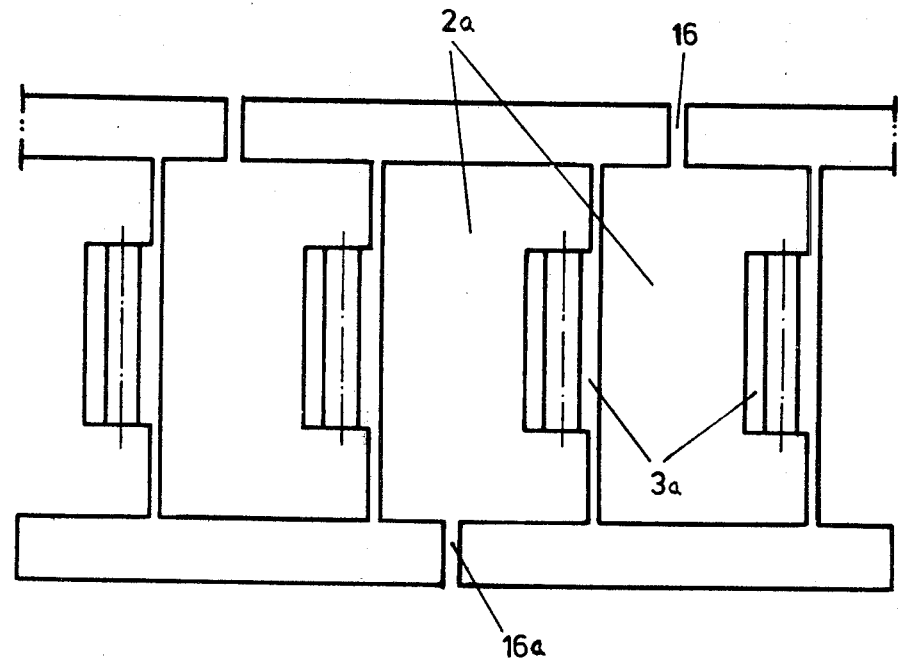
FIG. 7 is a partial view of the rolled-out sleeve of the ball bearing illustrated in FIG. 5.
Figure 9:
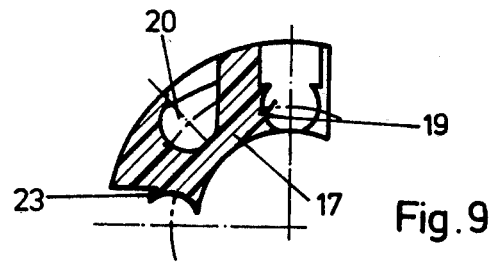
FIG. 9 is a cross-sectional view taken along the line A''–B'' through the track element illustrated in FIG. 8.
Figure 8:
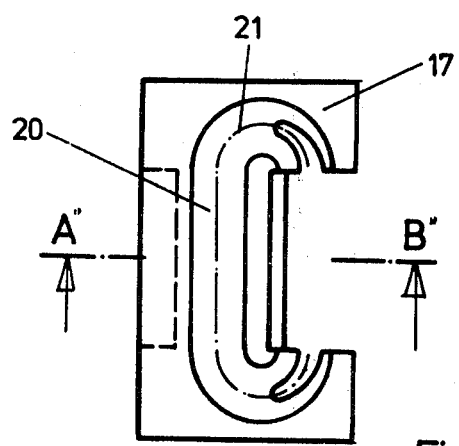
FIG. 8 is a plan view of an element of the ball bearing illustrated in FIG. 5.

In FIGS. 5, 6, 7, 8, and 9, there is illustrated another embodiment of the ball bearing, in accordance with the invention, having four closed rows of balls around its circumference. This variant consists of a sleeve 1a, made for instance of steel, having four radial apertures 2a distributed over the circumference between the lands 3a, four elements 17 made of an elastic material, for instance plastic, that are radially snap-mounted into the apertures 2a; one gasket 18 at each one of the extremities of the sleeve 1a is rendered stationary in the borehole 5a of said sleeve 1a; load-bearing balls 8a maintained between the lateral areas 19 of the elements 17 and non-load-bearing balls 9a accommodated and running in the axially oriented return groove 20 of the return guide in the elements 17. In this arrangement there is machined in each case, a deflector track 21 adjacent to the extremity of the axially oriented return groove 20 in the elements 17, which enter in the axially oriented tract 22 of the load-bearing balls 8a (formed between the lateral areas 19 of two adjoining elements 17). Holding lugs 23 of the elastic elements 17 snap, upon assembly of the ball bearing, into the borehole 5a of the sleeve 1a and are therefore maintained at the edge of the radial aperture 2a. The sleeve 1a is provided also in this instance in the area of the apertures 2a with an axially oriented slot 16a, alternately at one face and then at the other face thereby exhibiting at its circumference a great elastic yieldability. Upon assembling the ball bearing of this embodiment, one introduces and snaps in, following the insertion of the elements 17, the balls from the outside again into each element 17. In the lands 3a there is provided on the inside respectively one axially oriented track groove 24 for the load-bearing balls 8a, which can readily be provided by machining or grinding, with high accuracy, in view of the fact that it is not followed by any track bends. The lands 3a of the sleeve 1a have been designed to be spherical in axial direction on the outer surface 25. As a result, one achieves an angular adjustability of the central portions of these lands 3a situated within the bending elasticity range of the extremities of the lands, and slight oblique positions of the shaft can be absorbed by the ball bearing without impairing same; both the central position of the land 3a and the pertinent elements 17 maintained in the bore 5a by the holding lugs 23, can be adjusted with respect to one another, thereby guaranteeing at any time an aligned connection between the deflector track 21 and the axially oriented track 22 of the load-bearing balls 8a. Also in this embodiment of the ball bearing in accordance with the invention, there has not been provided any ball retainer. As a result, one obtains a relatively simple and inexpensive design of the ball bearing.

While the invention has been disclosed with reference to a limited number of embodiments, it will be apparent that variations and modifications may be made therein, and it is intended in the following claims to cover each such variation and modification as falls within the true spirit and scope of the invention.

What is claimed is:

1. A linear ball bearing which has a sleeve, continuous rows of load-bearing and non-load-bearing balls distributed over the bearing circumference, and which has for each row of balls a radial aperture in said sleeve, characterized in that said apertures distributed over the circumference of the sleeve are separated by axially oriented lands, and there are inserted in said apertures return elements that include return grooves for the non-load-bearing balls of each continuous row of balls.

2. A ball bearing in accordance with claim 1, characterized in that, in each land there is an axially oriented track for the load-bearing balls and at the ends of each axial track a deflector track.

3. A ball bearing according to claim 1, characterized in that said sleeve has a bore and within said bore is an annular ball retainer having an axially oriented guide groove for the load-bearing balls of each continuous row of balls and has, between two adjoining guide grooves a radial recess engaged by a radially inwardly oriented projection of the return element.

4. A ball bearing according to claim 1, characterized in that, each of said lands includes therein an axially oriented track for the load-bearing balls and that each return element includes a deflector track at the ends of the return groove in said element.

5. A ball bearing in accordance with claim 4, characterized in that each return element has lateral faces to guide the adjoining load-bearing balls.

6. A ball bearing according to claim 1, characterized in that at least at one end of the sleeve there is inserted a gasket in the bore of said sleeve.

7. A ball bearing according to claim 1, characterized in that the lands of the sleeve are spherical in axial directions at their outer surface.

8. A ball bearing in accordance with claim 1, characterized in that the sleeve is axially slotted in the area of the apertures alternately in both axial directions.

9. A ball bearing in accordance with claim 1, characterized in that the sleeve comprises a strip of sheet metal that has been rolled to constitute a cylinder subsequent to the machining thereof of said tracks and apertures.

10. A ball bearing in accordance with claim 1, characterized in that the return elements are made of an elastic material having lubricating properties.

11. A ball bearing in accordance with claim 1, characterized in that the lateral faces of the return elements have projecting holding lugs elastically engaging the bore of the sleeve.

12. In a linear ball bearing including a sleeve housing and a plurality of continuous rows of load-bearing and non-load-bearing balls the improvement in combination therewith wherein said sleeve includes a plurality of circumferentially spaced radially extending apertures, and adjacent each of said apertures an axially oriented land with a load-track therein for load-bearing balls, said bearing further comprising an insert, including therein a return groove for non-load-bearing balls, inserted in each of said apertures, said sleeve further including a deflector track at each end of each load-track for communicating balls therein to the return groove in the insert adjacent to said land and load-track therein.

13. A ball bearing according to claim 12, wherein said sleeve further comprises a slot extending axially from each of said apertures, said slots being directed alternately in opposite axial directions.

14. A ball bearing according to claim 12, wherein said inserts comprise resilient means for releasably engaging said sleeve in said apertures.

15. A ball bearing according to claim 14, wherein said inserts comprise relisient plastic.

16. A ball bearing according to claim 12, further comprising ball retainer means for guiding the balls in each of said rows of balls.

17. A ball bearing according to claim 12, wherein said lands are on the outer circumference of the sleeve, and the outer surfaces of said lands are spherical in the axial direction thereof.

18. A ball bearing according to claim 12, wherein said sleeve is elastic.

* * * * *